United States Patent [19]

Lehman

[11] Patent Number: 4,571,058

[45] Date of Patent: Feb. 18, 1986

[54] FLASH ILLUMINATION AND OPTICAL IMAGING SYSTEM

[75] Inventor: Richard F. Lehman, Webster, N.Y.

[73] Assignee: Xerox Corporation, Stamford, Conn.

[21] Appl. No.: 669,490

[22] Filed: Nov. 8, 1984

[51] Int. Cl.$^4$ ............................................. G03G 21/00
[52] U.S. Cl. ..................................... 355/3 R; 362/97; 355/67
[58] Field of Search ........................ 355/3 R, 67–69, 355/133; 362/3, 8, 12, 97, 16–18

[56] References Cited

U.S. PATENT DOCUMENTS

| 3,428,397 | 2/1969 | Elmer | 362/97 X |
| 3,669,538 | 6/1972 | Fowler | 362/97 X |
| 4,250,538 | 2/1981 | Durbin et al. | 362/97 |
| 4,334,767 | 6/1982 | Lehman | 355/68 |
| 4,466,734 | 8/1984 | Rees | 355/67 |
| 4,533,979 | 8/1985 | Rees et al. | 355/67 X |

Primary Examiner—R. L. Moses

[57] ABSTRACT

A full-frame flash illumination and imaging system is disclosed wherein an optical component located in the floor of the light housing compensates for unwanted charge variations on a photoreceptor belt caused by reflections of the lens from the document platen. The area of the belt upon which a negative lens image is formed is predetermined and a controlled quantity of light is directed towards this area, using light generated in the housing during exposure, to reduce the charge level of the area to the degree necessary to compensate for the negative lens image. Several optical components useful for this purpose are disclosed including a light pipe and a second projection lens.

5 Claims, 3 Drawing Figures

FLASH ILLUMINATION AND OPTICAL IMAGING SYSTEM

BACKGROUND OF THE INVENTION

The present invention relates generally to an illumination system in an electrophotographic printing machine and more particularly, to a full-frame flash illumination system contained within a light housing.

As demands for faster copying and duplicating have increased, conventional machines which scan documents in incremental fashion to provide a flowing image on a xerographic drum have proved inadequate. New high speed techniques have evolved which utilize flash exposure of an entire document and the arrangement of a moving photoconductor in a flat condition at the instant of exposure. Full efficiency of such prior art systems has been realized by enclosing the illumination system within a light housing. The interior walls of such a housing may be diffusely or specularly reflective to produce multiple reflections of light emanating from the illumination source contained within the housing. A uniform level of illumination is produced at the object plane; generally a transparent platen upon which the document to be reproduced is positioned. U.S. Pat. No. 4,250,538 is representative of such systems.

In these prior art systems, the imaging lens is positioned within the floor of the light housing and, in a multi-magnification mode, is moved laterally and vertically to positions required by magnification changes. One problem with these prior art imaging systems is that an image of the lens face is reflected from the bottom surface of the transparent platen and is projected back through the lens onto the photoreceptor surface. This negative disc image termed a "black hole" is subsequently developed as part of the document image and, upon transfer to a recording sheet, appears as a relatively dark spot on the output copy. Various expedients have been tried to reduce this problem. For example, as disclosed in U.S. Pat. No. 4,250,538, the lens barrel is painted white to reduce the size of the reflected lens image. In copending U.S. application Ser. No. 608,300 the unwanted lens image is located at the photoconductor and discharged to a lower level by an appropriately positioned illuminator.

It is therefore an object of the present invention to reduce or eliminate the "black hole" problem in full-frame flash-type systems. It is a further object to improve the invention disclosed in the aforementioned U.S. Application. This object is accomplished, according to the invention by providing a flash illumination and optical imaging system for reproducing documents on an object plane onto a photoreceptor belt member comprising, in combination:

a transparent object plane for supporting original documents to be reproduced;

an enclosed document illumination housing positioned beneath said object plane;

an illumination means positioned interior of said housing and adapted to be periodically energized to provide a generally uniform level of illumination at said object plane;

a projection lens mounted in the bottom surface of said housing opposite said object plane, said lens adapted to project an image of said document onto said photosensitive belt, said projected image containing a superimposed image of the projection lens face as reflected from said object plane; and means for directing a portion of the illumination produced within said housing onto the area of said belt conforming to the area of said negative lens image so as to reduce the charge on said lens image area.

DESCRIPTION

Figure 1:
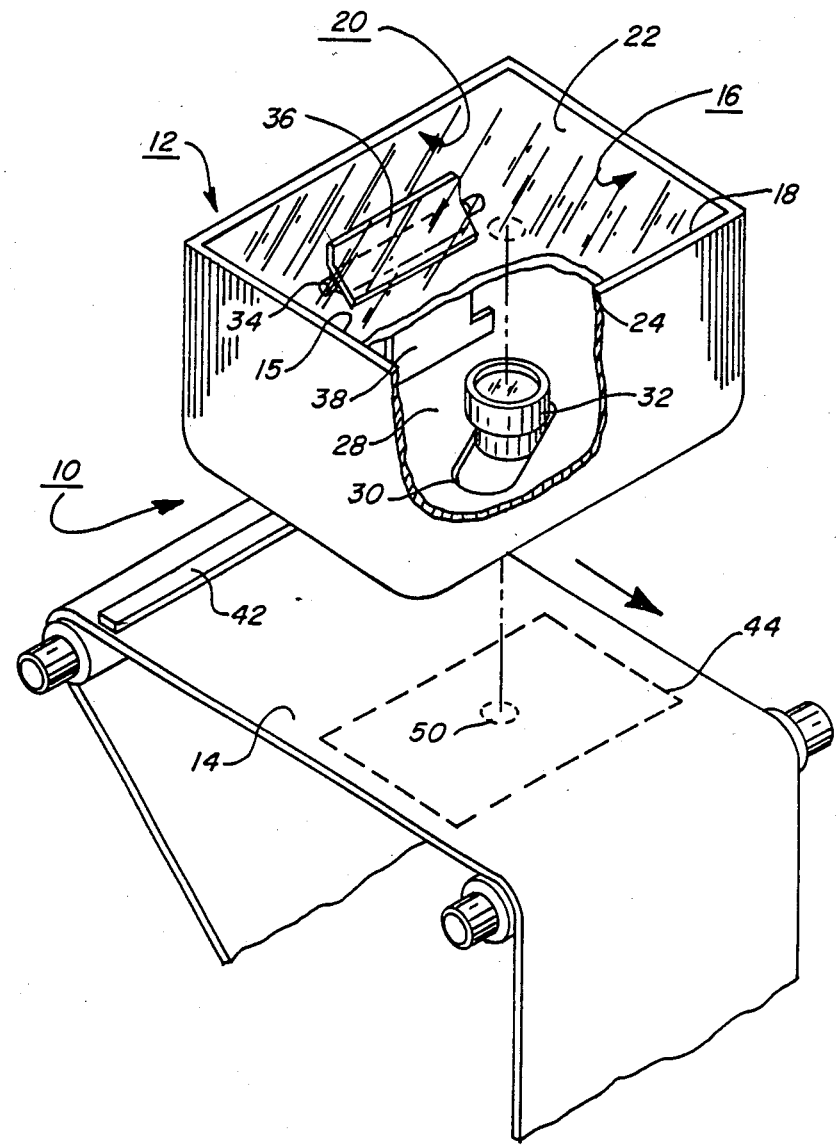
FIG. 1 is a partial perspective view of a prior art full-frame illumination and imaging system showing a dark hole charge formation on a photoreceptor surface.

Referring to the drawings, FIG. 1 shows a document imaging system 10 which includes an integrating optical cavity 12 and a photoreceptor belt 14 (only a portion of which is shown). Cavity 12 is a completely enclosed housing, generally rectangular in shape, having a first pair of opposing side walls 15, 16 and a second pair of opposing side walls 18, 20. An upper, or top wall is formed by seating a glass platen 22 into aperture 24. The lower, or bottom wall 28 has an aperture 30 therein which accommodates a circular lens 32.

Mounted in the lower half of side wall 20 is flash illumination lamp 34 which may be, for example, a Xenon gas lamp. The lamp is connected to circuitry (not shown) which, when activated, energizes the lamp, resulting in an illumination flash of appropriate duration. The interior walls of the cavity have substantially diffusely reflecting surfaces which cause the flashed light to undergo multiple reflections from the walls, providing a uniform level of illumination at the underside of platen 22. Blockers 36 and 38 prevent direct light from reaching platen 22 and lens 32, respectively.

In operation, an original document to be copied (not shown) is placed on platen 22. Upon triggering of an illumination flash, the document is uniformly illuminated by the light, diffusely reflected from the cavity walls. The light rays are reflected from the document platen and are projected as a light image of the original document through lens 32 onto photoreceptor belt 14. The surface of belt 14 has been charged at a point prior to the exposure station to a uniform charge level by a corona generating device 42. As the light image of the document strikes the surface, informational areas are discharged to form an electrostatic latent image 44 conforming to the original document image. The belt is moved in the indicated direction, passing through a developing station (not shown) where the latent image is developed by coating it with a finely divided electrostatically attractable powder referred to as a "toner". Thus, a toner image is produced in conformity with a light image of the document being reproduced. Generally, the developed image is then transferred to a suitable transfer member such as paper and the image is fused. The specific mechanics for accomplishing the charging, development, transfer and fusing are well known in the art, e.g. in U.S. Pat. No. 4,318,610 whose contents are hereby incorporated by reference.

Referring again to FIG. 1, after lamp 34 has flashed, cavity 10 effectively acts as the light source. In addition to producing the original level of illumination at the document surface, the cavity also generates a stray light component which is reflected from the underside (and top) of the platen and is projected through the lens to discharge areas of the photoreceptor. In some systems, this stray light can be compensated for by increasing the amount of charge deposited on belt 12 by corona device 42 or by applying an antireflection coating to the underside and top of platen 22. However, a remaining problem is that the face of lens 32 is seen as a black disc in the image reflected from the bottom of the platen. That is, if viewed through the lens from a point on the photoreceptor surface, an inversely located cavity would be seen with a black disc at the upper "surface" corresponding to the lens location. This black disc is projected onto the surface of belt 14 forming a generally circular image area 50 approximately ½ the size of the actual lens (at 1:1 magnification) and having a higher charge level than desired. The edges of the image would be slightly out of focus. Image area 50 would thus be developed as an information area superimposed on either an actual image area or an area otherwise white (non-information) area. The developed "black hole" image would then be developed and transferred to the recording paper resulting in an objectionable output copy. This lens image is especially conspicuous if it happens to fall in a large light grey image area.

Figure 2:
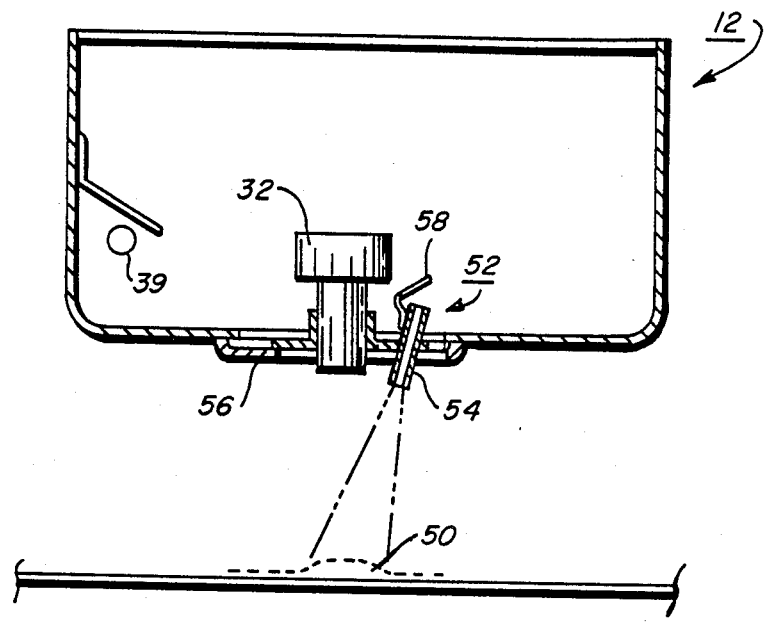
FIG. 2 shows a first embodiment of an illumination housing incorporating an optical charge neutralization device.

According to a first aspect of the invention, the area on the belt upon which the black disc image of the lens is projected is predetermined for a particular magnification mode. An optical component is mounted in the floor 28 of the housing and arranged so as to direct a portion of the stray light from within the housing onto image 50 so as to reduce the charge level at that area. FIG. 2 shows a first embodiment of such an optical component. A light pipe 52 is mounted at a preferential angle so as to direct illumination onto area 50 at a time coinciding with the image exposure. The length and diameter of the pipe are dictated by the size of image area 50 and the amount of light needed for exposure. A typical construction for pipe 52 would consist of a hollow cylinder 54, containing a centrally located pinhole at each end. The length of the cylinder and diameter of the first (object side) pinhole dictate the irradiance distribution at the photoreceptor. The diameter of the second (image side) pinhole controls the exposure level. The two pinholes, in combination, control both the shape and absolute level of the exposure.

Cylinder 54 is mounted on lens carriage 56 and is adapted to move with the lens during magnification changes so as to maintain the proper position for desired charge level reduction. Reflector cap 58 may be added to avoid introduction of document reflected light into the cylinder.

Figure 3:
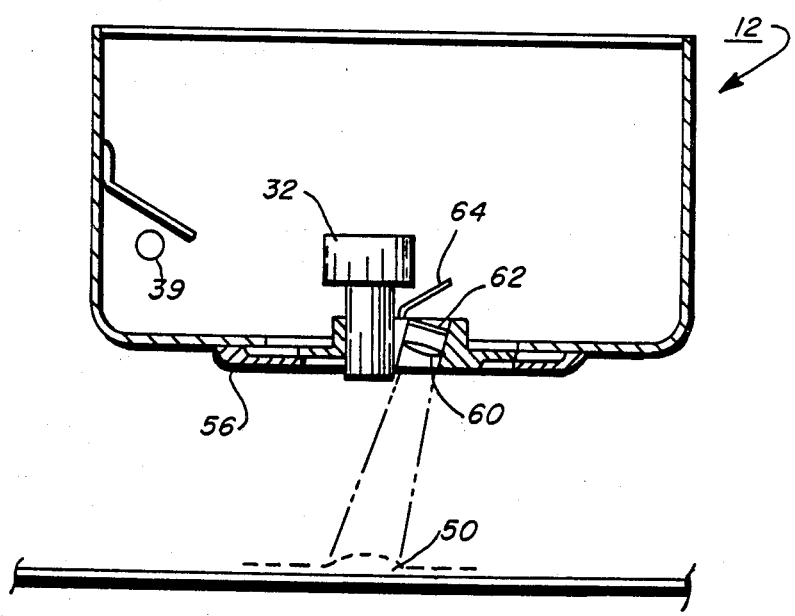
FIG. 3 shows a second embodiment of an optical charge neutralization device.

FIG. 3 shows a second embodiment of the invention wherein the optical component is a positive projection lens 60 movably mounted adjacent lens 32. Lens 60 is used in conjunction with transparency 62 positioned above the lens as shown in FIG. 3. Transparency 62 is formed with transmission characteristics containing an inverse image of the stray light pattern. This pattern is then projected onto area 50 producing a "soft" image discharge. Lens 60 can be a wide angle lens designed to provide stray light control beyond the dimensions of area 50. As in FIG. 2, a reflector cap 64 is added to prevent light reflected from the document from being projected by the lens.

While either light pipe 52 or lens 60 can be located in any appropriate location on the housing floor for a unity magnification system, a multi-magnification system, for example, a reduction system, requires that lens 32 move towards the image plane in a three-dimensional path so as to maintain proper image registration. The reflected image of the lens thus changes position on the belt requiring that light pipe 52 or lens 60 must be movable so as to direct light onto the new "black hole" location. This movement can be accomplished by mounting the component on the lens carriage as described above. A camming arrangement (not shown) may also be desirable to translate lens movement into a simultaneous repositioning of the optical component so that the light being directed (by pipe 52) or projected (by lens 60) falls on the new location.

While specific embodiments of the invention have been described, other changes or modifications are possible consistent with the principles of the present invention. For example, while the various embodiments are directed toward solving the lens "black hole" problem, the photoreceptor may suffer from stray light non-uniformities in areas other than the lens image. Therefore, more than one optical component may be placed in the cavity floor to compensate for a more complex stray light pattern on the photoreceptor. All such modifications and changes are intended to be embraced by the following claims.

What is claimed is:

1. A flash illumination and optical imaging system for reproducing documents on an object plane onto a photoreceptor belt member comprising, in combination:
   a transparent object plane for supporting original documents to be reproduced;
   a document illumination housing positioned beneath said object plane;
   an illumination means positioned interior of said housing and adapted to be periodically energized to provide a generally uniform level of illumination at said object plane;
   a projection lens mounted in the bottom surface of said housing opposite said object plane, said lens adapted to project an image of said document onto said photosensitive belt member, said projected image containing a superimposed image of the projection lens as reflected from said object plane; and
   at least one optical means for directing a portion of the illumination produced within said housing onto the area of said belt member conforming to the area of said negative lens image so as to reduce the charge on said lens image.

2. The illumination and optical imaging system of claim 1 wherein said directing means is a light pipe positioned in the bottom surface of said housing.

3. The illumination and optical imaging system of claim 1 wherein said directing means is a second projection lens positioned in the bottom surface of said housing.

4. The illumination and optical imaging system of claim 1 wherein said optical means is repositioned in a reduction mode of operation so that light emitted by said component is redirected towards a new location for said superimposed lens image.

5. The illumination and optical imaging system of claim 1 wherein at least two optical means direct portions of the illumination produced within the housing onto separate areas of the belt member.

* * * * *